Figure 1:
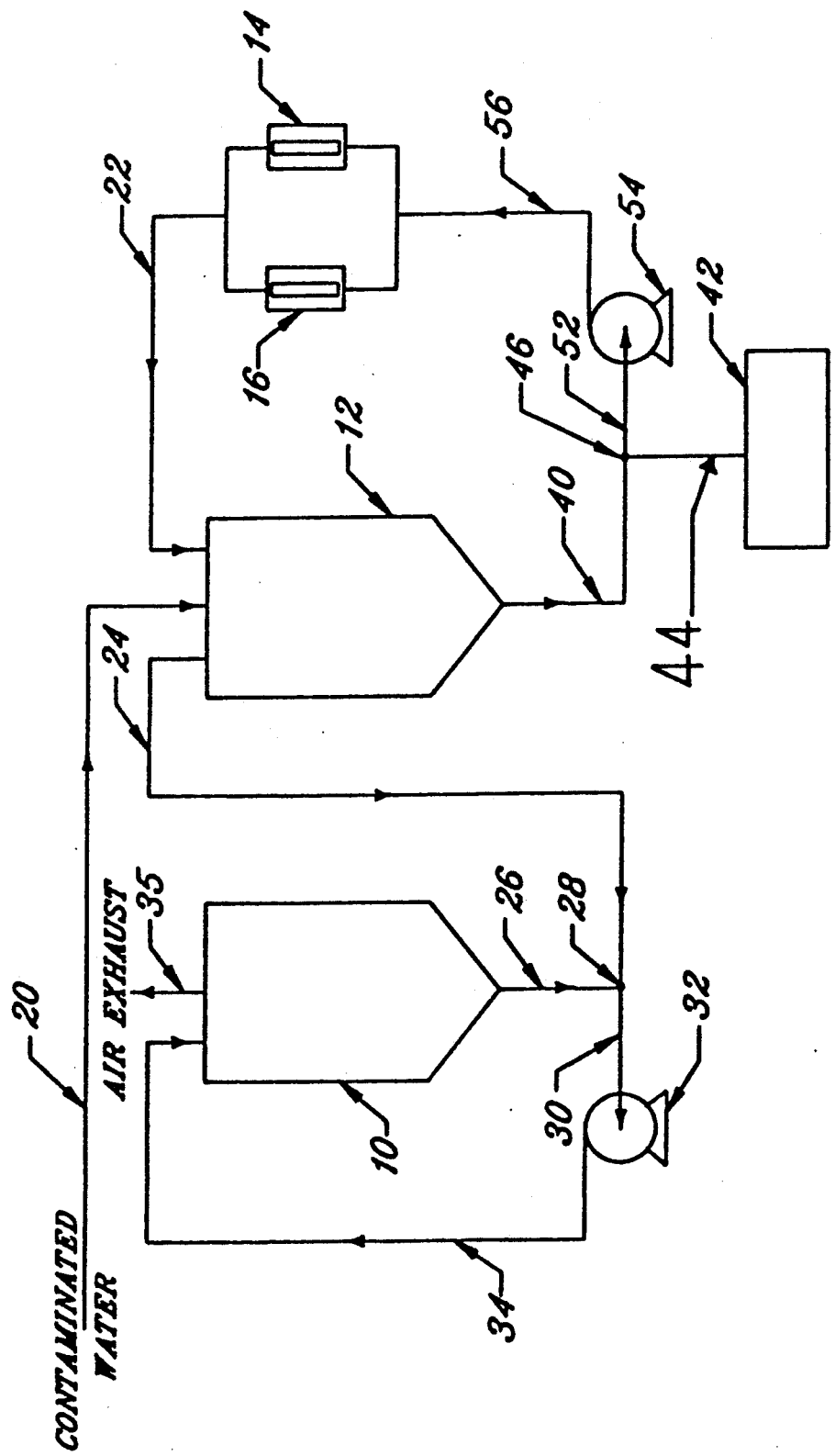

United States Patent [19]
Hallett

[11] Patent Number: 5,043,079
[45] Date of Patent: Aug. 27, 1991

[54] WASTEWATER TREATMENT PROCESS WITH AN OZONE CONTACTOR

[75] Inventor: Ronald C. Hallett, Pickering, Canada

[73] Assignee: Solarchem Enterprises Inc., Richmond Hill, Canada

[21] Appl. No.: 645,311

[22] Filed: Jan. 24, 1991

Related U.S. Application Data

[63] Continuation of Ser. No. 379,136, Jul. 13, 1989, abandoned.

[51] Int. Cl.⁵ .............................. C02F 1/32; C02F 1/78
[52] U.S. Cl. .................................... 210/748; 210/758; 210/760; 210/765
[58] Field of Search ............ 210/748, 760, 790, 195.1, 210/205, 758, 765

[56] References Cited

U.S. PATENT DOCUMENTS

| | | | |
|---|---|---|---|
| 2,220,574 | 11/1940 | Little et al. | 210/540 |
| 2,242,139 | 5/1941 | Munroe | 210/540 |
| 2,746,605 | 5/1956 | Baum | 210/526 |
| 2,845,871 | 8/1958 | Compton | 417/69 |
| 3,102,083 | 8/1963 | Adams | 203/11 |
| 4,002,561 | 1/1977 | Traverse | 210/621 |
| 4,043,913 | 8/1977 | Hintermeister | 261/125 |
| 4,252,654 | 2/1981 | Leitzke et al. | 210/760 |
| 4,255,257 | 3/1980 | Greiner et al. | 210/760 |
| 4,744,956 | 5/1988 | Yant et al. | 261/76 |

Primary Examiner—Peter Hruskoci
Assistant Examiner—Cynthia L. Nessler
Attorney, Agent, or Firm—Rogers Bereskin & Parr

[57] ABSTRACT

During the oxidation or photooxidation of contaminants in wastewater, a gaseous oxidizing agent is introduced into a wastewater steam. The mixed stream is passed through a liquid ring compressor prior to its entry into an ultraviolet light reactor. In an alternate embodiment, the oxidizing agent and the wastewater are each introduced into the liquid ring compressor.

6 Claims, 1 Drawing Sheet

WASTEWATER TREATMENT PROCESS WITH AN OZONE CONTACTOR

This application is a Continuation; application of Ser. No. 07/379,136, filed Jul. 13, 1989.

This invention relates to the field of the oxidation or photooxidation of contaminants in wastewater streams. More specifically, this invention provides a new and useful ozone contactor capable of efficiently contacting a wastewater stream which is to be oxidized or photooxidized with a gaseous stream containing ozone.

In known processes for the oxidation or photooxidation of wastewater contaminants, oxidizing agents such as hydrogen peroxide and ozone are typically added to the wastewater. Once the oxidizing agents are introduced into the wastewater stream, the wastewater stream is passed into a reactor where the contaminants in the wastewater are oxidized. Depending on the contaminants to be oxidized, the oxidation may occur in one or more steps each involving the use of different oxidizing agents or combinations of oxidizing agents.

When ozone is used as an oxidizing agent, particular problems are encountered. First, as ozone is a gaseous substance, it is necessary to provide intimate mixing of the ozone with the wastewater. This is particularly so since, typically, ozone is supplied as 1 to 3 wt. % ozone in air. In some cases, concentrations of up to 5 or 6 wt. % ozone in oxygen may be available for use. Accordingly, the oxidizing agent usually is present in relatively low amounts. Equipment which may be used for the continuous contacting of a gaseous stream containing ozone and a wastewater stream are packed column spray towers, bubble-cap or valve type plate columns operated in a counter-current mode, agitated or stirred vessels, venturi mixers, static in-line mixers and bubble columns where the ozone stream is bubbled up via a sparger through a column of non-flowing water.

Absorption columns and similar equipment are relatively expensive and require regular monitoring to ensure that the proper process conditions are maintained for the absorption of the gas into the liquid. This increases the cost and complexity of any system which utilizes such equipment. In addition, ozone generators typically require relatively low operating pressures (e.g. 10-15 psi). Bubble columns, other contact columns and venturis require higher gas pressures for efficient operation. This requires the provision of an additonal step to compress the ozone containing gas to the required pressure. Such compression may result in ozone destruction due to excessive mechanical agitation.

An alternate way of introducing the ozone into the wastewater is to use a sparger whereby the ozone is bubbled into a holding tank containing the wastewater. In some cases, liquid and gases have been passed through conventional pumps to mix the streams (U.S. Pat. Nos. 2,242,139 and 2,746,605). While such methods avoid the use of expensive absorption columns, the rate of wastewater treatment is decreased due to the time required for the ozone to be dispersed in the wastewater.

Since ozone is corrosive, the equipment which is used to handle ozone must be resistant to its corrosive effect. Thus, equipment used to handle ozone is typically made of stainless steel or TEFLON ®. The use of such equipment only serves to increase the cost of an absorption column or like equipment.

It is an object to provide an ozone contactor which is a small unit. This would minimize the cost of the ozone contactor due to the use of stainless steel and other such ozone resistant materials. Further, it is an object of the present invention to provide an ozone contactor which can operate on a continuous basis and be able to properly mix the low concentrations of ozone in a carrier gas with the wastewater. An additional object of the present invention is to provide for large water and ozone throughput while ensuring adequate mixing for efficient ozone transfer from the carrier gas to the water. It is also an object of the present invention to provide a simplified process and simplified equipment for the oxidation and photooxidation of contaminants in wastewater the results of which are equal to or better than those obtained using other continuous contacting equipment.

Pursuant to the present invention, wastewater is first mixed with the gaseous oxidizing agent. Subsequently, the combined wastewater/gaseous oxidizing agent stream is passed through a liquid ring compressor prior to its entry into a reactor.

In an alternate embodiment, the wastewater stream and the gaseous stream are fed separately to the liquid ring compressor. The resultant stream which exits the compressor is subsequently fed into the reactor.

Liquid ring compressors are known in the art. Typically, liquid ring compressors are used to compress gases where the presence of oil in the compressed gas may be a problem. For example, liquid ring compressors are used to provide compressed air in hospitals.

Liquid ring compressors have also been used in other manners. For example, U.S. Pat. No. 3,102,083 teaches the use of a liquid ring compressor to condense vapours and compress gases in a distillation unit. This patent specification describes a combination of a liquid ring compressor and a centrifugal pump U.S. Pat. No. 2,845,871 discloses a mixed flow booster pump for an airplane fuel tank. Such a unit comprises a combination of a liquid ring compressor and a mixed flow booster pump to pump the liquid and gaseous fuel from the fuel tank to the engine of an airplane.

The present invention relies on a novel use of a liquid ring compressor, namely the use of the compressor to replace an absorption column or other gas/water contacting means. In contrast to previous devices, the ozone contactor of the present invention combines the advantages of small size, simplistic operation, efficiency, high output and cost effectiveness. The liquid ring compressor is easy to operate and does not require monitoring during its operation. Further, it combines the advantages of an absorption column, namely high output, with the cost savings and simplicity of earlier devices, such as a venturi or an in-line mixer.

For a better understanding of the present invention, and to show more clearly how it will be carried into effect, reference will now be made, by way of example, to the accompanying drawing, which shows an embodiment of the present invention and in which:

FIG. 1 shows a process flow sheet of an embodiment of this invention.

Referring to FIG. 1, the process utilizes two holding/working tanks, 10, 12 and two secondary reactors 14, 16. The process is operated as a semi-batch system in which tanks 10, 12 are alternately operated as a holding tank and then as a working tank. As will become apparent, the holding tank is used to pretreat the contaminated water.

As shown in FIG. 1, tank 10 is being operated as the holding tank and tank 12 is the working tank. In the next batch operation tank 10 will be operated as the working tank and tank 12 will be the holding tank. During the previous operation, wastewater was introduced into tank 12 by stream 20 until holding tank 12 was filled. The wastewater source to be treated may be ground water, contaminated with an organic or oxidizable coumpounds such as trichloroethylene, dichloroethylene or methanol. Alternatively, the contaminated water may be an industrial wastewater containing organic or oxidizable contaminants such as phenol, resorcinol, pentachlorophenol, benzene. Accordingly, as will be explained below, as tank 12 was operated as the holding tank in the previous batch, it contains a mixture of air, ozone and contaminanted water.

Ozone is introduced into the system via stream 44 from ozone generator 42. Stream 44 consists essentially of air containing approximately 1-3% $O_3$ by weight and preferably 1-2% $O_3$ by weight. Wastewater stream 40 is drawn form working tank 12 and combined with stream 44 at point 46 by means of a T-joint or any other manner which is used in the art to produce stream 52. Stream 52 passes through liquid ring compressor 54 which produces stream 56.

The basic liquid ring compressor is well known in the art and needs no detailed description here. It is designed to pump and compress air or gas by the displacement action of its liquid ring as this ring is driven by a rotor within an eccentric or elliptical casing. As the ozone and partially treated water pass through the liquid ring compressor and into stream 56, the ozone dissolves into the partially treated wastewater. The liquid ring compressor provides a very efficient means of intimately contacting the wastewater and the ozone. This provides a means of increasing the throughput of the system without utilizing an absorption column or similar device.

Liquid ring compressor 54 is the primary ozone contactor. Stream 56 contains wastewater with dissolved ozone and gaseous ozone and air. Stream 56 passes into reactors 14 and 16. In reactors 14 and 16, the wastewater containing dissolved ozone is exposed to ultraviolet light. The treated wastewater leaves reactors 14, 16 and produces recycle stream 22 which is fed into working tank 12.

Excess ozone and air is drawn off the top of working tank 12 as stream 24. This stream will contain a mixture of ozone and air. The ozone concentration in the stream will vary from zero at the beginning of the batch operation to almost 1-3 wt. % $O_3$ air depending upon the concentration of ozone in stream 44 when the wastewater in the working tank has been substantially saturated with ozone and/or the oxidizable contaminants are substantially destroyed.

Stream 26, which is drawn from holding tank 10, comprises untreated wastewater. Stream 26 is combined with stream 25 at point 28 with a T-joint or any other manner which is used in the art to form stream 30. Stream 30 contains a mixture of ozone, air and wstewater. Stream 30 is passed through liquid ring compressor 32 to form return stream 34. Liquid ring compressor 32 is the secondary ozone contactor. The liquid ring compressor is particularily useful in this situation (recycle of ozone stream) as the air/ozone mixture (stream 24) is at very low pressure and is not very useful without some sort of compression. The liquid ring compressor provides both the necessary suction and mixing required to successfully recycle this stream.

Stream 34 which contains wastewater with dissolved ozone and air is fed into holding tank 10. In order to avoid a build-up of air in holding tank 10, air is exhausted from the holding tank by a stream 35.

The process is operated until the desired level of treatment of the water in tank 12 is reached. At this point, the water in working tank 12 is drained from the tank. This water may be sent for further processing, recycled within the plant or discharged from the plant. At this time, the roles of holding tank 10 and working tank 12 are reversed. Tank 10, which contains water mixed with ozone and air, becomes the working tank. Tank 12 is filled with contaminated wastewater through stream 20 and accordingly becomes the holding tank. By utilizing an alternate series of parts (not shown), tank 10 is connected with secondary reactors 14, 16 and the water in tank 10 is treated. During this operation, the water in tank 12 will be exposed to ozone and, accordingly, pretreated.

It is understood that the subject invention is suseptible to numerous modifications and adaptations that will be obvious to those of skill in the art. The present invention will now be described by means of the following example.

Example 1

With the equipment set up as shown in FIG. 1, water containing resorcinol was added to working tank 12. The process was operated as set out in FIG. 1. The water flow taken from tank 12 by stream 40 was 7 gpm. 30 liters per minute of air containing ozone was introduced into the system via stream 44. The volume of holding tank 12 was 150 liters. The concentration of ozone in stream 44 was approximately 1.17 percent by weight (15 mg/l).

The batch process was operated until the water containing resorcinol in holding tank 12 was treated for 30 minutes. Samples were taken from holding tank 12 every 15 minutes until the process was complete. The following table sets out the batch time when samples were taken, the amount of ozone utilized and the concentration of resorcinol in tank 12.

TABLE 1

| Batch Time (min) | Ozone Used (g) | Concentration of Resorcinol (ppm) |
| --- | --- | --- |
| 0 | 0 | 104.5 |
| 15 | 6.9 | 22.5 |
| 30 | 13.8 | 0.6 |

A second batch was run with the following differences. In place of the liquid ring compressor, a venturi mixer was utilized. In order for the venturi to properly operate, the water flow in stream 40 was increased to 25 gpm. This resulted in an respective increase in the rate of flow of recycle stream 22. The air/ozone flow rate was 47.2 liters per minute. The following table sets out the batch time, and amount of ozone utilized and concentration of resorcinol in tank 12.

| Batch Time (min) | Ozone Used (g) | Concentration of Resorcinol (ppm) |
| --- | --- | --- |
| 0 | 0 | 108 |
| 15 | 10.4 | 5.5 |

| Batch Time (min) | Ozone Used (g) | Concentration of Resorcinol (ppm) |
|---|---|---|
| 30 | 20.7 | <1 |

As can be seen from the above comparative example, in order to use a venturi, it was necessary to more than triple the water flow rate in stream 40. This does not result in any reduction in the treatment time. In addition, the flow rate of stream 44 (ozone in air) had to also be substantially increased. At the end of 30 minutes, the concentration of recorcinol in tank 12 was less than 1 ppm in both cases. However, by utilizing the liquid ring compressor, only 13.8 grams of ozone had been utilized instead of 20.7 grams which was utilized when the venturi was inserted. Thus, 166 less ozone was required when the liquid ring compressor was utilized.

I claim:

1. In a process for the oxidation or photooxidation of oxidizable or photooxidizable contaminants in wastewater in which the contaminants in the wastewater are exposed to a gaseous oxidizing agent by combining a mixture of the wastewater and the oxidizing agent and passing the mixture through an ultraviolet light reactor, the improvement wherein said wastewater is contacted with said gaseous oxidizing agent by first providing a step for introducing said oxidizing agent into a combined mixture of said wastewater to form said combined mixture, passing said combined mixture through a liquid ring compressor and thereafter passing said stream to a working tank from which said combined mixture is further recycled to said introducing step until the oxidizable contaminants of the wastewater stream are substantially destroyed, wherein said ring compressor provides intimate contact of said wastewater with said oxidizing agent while increasing the throughput of said wastewater through said process without utilizing an absorption column.

2. A process for the oxidation or photooxidation of wastewater containing oxidizable or photooxidizable contaminants comprising a step for introducing a gaseous oxidizing agent into the wastewater to form a combined mixture, passing the combined mixture first through a liquid ring compressor then through ultraviolet light reactor so as to permit said oxidizing agent to oxidize said contaminants and thereafter passing the combined mixture to a working tank from which said combined mixture is further recycled to said introducing step until the oxidizable contaminants of the wastewater stream are substantially destroyed, wherein said ring compressor provides intimate contact of said wastewater with said oxidizing agent while increasing the throughput of said wastewater through said process without utilizing an absorption column.

3. In a process for the oxidation or photooxidation of oxidizable or photooxidizable contaminants in wastewater in which the contaminants in the wastewater are exposed to a gaseous oxidizing agent by combining a stream of the wastewater and a stream of the oxidizing agent and passing the combined stream through an ultraviolet light reactor, the improvement wherein said wastewater is contacted with said gaseous oxidizing agent by providing a step in which each are introduced into a liquid ring compressor to form a combined stream which is thereafter passed to a working tank from which said combined stream is further recycled to said introducing step until the oxidizable contaminants of the wastewater stream are substantially destroyed, wherein said ring compressor provides intimate contact of said wastewater with said oxidizing agent while increasing the throughput of said wastewater through said process without utilizing an absorption column.

4. A process for the oxidation or photooxidation of wastewater containing oxidizable or photooxidizable contaminants comprising a step for introducing a gaseous oxidizing agent stream and a wastewater stream into a liquid ring compressor to form a combined stream and then passing the combined stream through an ultraviolet light reactor so as to permit said oxidizing agent to oxidize said contaminants and thereafter passing said combined steam to a working tank from which said combined stream is further recycled to said introducing step until the oxidizable contaminants of the wastewater stream are substantially destroyed, wherein said ring compressor provides intimate contact of said wastewater with said oxidizing agent while increasing the throughput of said wastewater through said process without utilizing an absorption column.

5. A process as claimed in any one of claims 1, 2 or 3 wherein said gaseous oxidizing agent comprises ozone.

6. A process as claimed in any one of claims 1, 2 or 3 wherein said gaseous oxidizing agent comprises from about 1 to about 3 wt. % ozone in air.

* * * * *